(12) United States Patent
Khan et al.

(10) Patent No.: US 12,530,434 B2
(45) Date of Patent: Jan. 20, 2026

(54) CLASSIFYING DATA BY MANIPULATING THE QUANTUM STATES OF QUBITS

(71) Applicant: Telefonaktiebolaget LM Ericsson (publ), Stockholm (SE)

(72) Inventors: Sumsam Ullah Khan, Solna (SE); Ahsan Javed Awan, Vallentuna (SE); Gemma Vall-Ilosera, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1000 days.

(21) Appl. No.: 17/622,448

(22) PCT Filed: Jun. 28, 2019

(86) PCT No.: PCT/SE2019/050642
§ 371 (c)(1),
(2) Date: Dec. 23, 2021

(87) PCT Pub. No.: WO2020/263146
PCT Pub. Date: Dec. 30, 2020

(65) Prior Publication Data
US 2022/0253649 A1 Aug. 11, 2022

(51) Int. Cl.
G06N 20/00 (2019.01)
G06F 18/2411 (2023.01)
G06N 10/60 (2022.01)

(52) U.S. Cl.
CPC ......... *G06F 18/2411* (2023.01); *G06N 10/60* (2022.01); *G06N 20/00* (2019.01)

(58) Field of Classification Search
None
See application file for complete search history.

(56) References Cited

U.S. PATENT DOCUMENTS

2018/0349605 A1* 12/2018 Wiebe .................. G06N 3/045
2020/0342345 A1* 10/2020 Farhi .................... G06N 3/082

FOREIGN PATENT DOCUMENTS

WO 2015085190 A2 6/2015

OTHER PUBLICATIONS

Xiao et al "A Quantum-inspired Genetic Algorithm for data clustering," 2008 IEEE Congress on Evolutionary Computation (IEEE World Congress on Computational Intelligence), Hong Kong, 2008, pp. 1513-1519, doi: 10.1109/CEC.2008.4630993. (Year: 2008).*

(Continued)

*Primary Examiner* — Viker A Lamardo
*Assistant Examiner* — Leah M Feitl
(74) *Attorney, Agent, or Firm* — COATS & BENNETT, PLLC (57) ABSTRACT

A method of method of classifying data is disclosed. The method comprises manipulating quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device, wherein the magnitude of the angle between the modified first copy of the test vector and the modified first training vector is equal to the magnitude of the angle between the first copy of the test vector and the first training vector, and where the magnitude of the angle between the modified second copy of the test vector and the modified second training vector is equal to the magnitude of the angle between the second copy of the test vector and the second training vector. The method also comprises performing quantum interference between the modified first copy of the test vector and the modified second copy of the test vector, and the modified first training (Continued)

vector and the modified second training vector, to provide modified quantum states of the qubits, performing a measurement on one or more of the qubits, and classifying the test vector based on the measurement.

16 Claims, 6 Drawing Sheets

(56) References Cited

OTHER PUBLICATIONS

Xiong et al, "Quantum rotation gate in quantum-inspired evolutionary algorithm: A review, analysis and comparison study", Swarm and Evolutionary Computation, vol. 42, Oct. 2018, pp. 43-57, https://doi.org/10.1016/j.swevo.2018.02.020 (Year: 2018).*
Subhi et al, "Simple quantum circuit for pattern recognition based on nearest mean classifier". International Journal on Perceptive and Cognitive Computing, 2(2), 2016. https://doi.org/10.31436/ijpcc.v212.38 (Year: 2016).*
Kerenidis et al. "q-means: A quantum algorithm for unsupervised machine learning." arXiv preprint arXiv:1812.03584 (2018). (Year: 2018).*
Schuld, M. et al., "Implementing a distance based classifier with a quantum interference circuit", Europhysics Letters, Dec. 1, 2017, pp. 1-10, vol. 119, No. 6, Institute of Physics.
Chmielnicki, W., "A Novel Classifier Combining Supervised and Unsupervised Learning Methods", 2016 Third European Network Intelligence Conference, Sep. 5-7, 2016, pp. 232-238, Wroclaw, Poland.
Epanechnikov, V. "Non parametric estimation of a multivariate probability density theory of probability", Theory of Probability & Its Applications, Jul. 17, 2006, pp. 153-158, vol. 14, Issue 1.
Giovannetti, V. et al., "Quantum random access memory", Physical Review Letters, Mar. 26, 2008, pp. 1-4.
Dunjko, V. et al., "Exponential improvements for quantum-accessible reinforcement learning", Physics, Computer Science, Mathematics, Oct. 30, 2017, pp. 1-27.
Tannu, S. et al., "Not All Qubits Are Created Equal: A Case for Variability-Aware Policies for NISQ-Era Quantum Computers", Physics, Computer Science, Mathematics, May 25, 2018, pp. 1-12.
Lloyd, S. et al., "Quantum algorithms for supervised and unsupervised machine learning", Mathematics, Physics, Jul. 1, 2013, pp. 1-11.
Niemann, P. et al., "Logic Synthesis for Quantum State Generation", 2016 IEEE 46th Symposium on Multiple-Valued Logic, May 18-20, 2016, pp. 247-252, Sapporo, Japan.
Fisher, R. A., "The Use of Multiple Measurements in Taxonomic Problems", Annals of Human Genetics, Sep. 1, 1936, pp. 180-188.
Rebentrost, P. et al., "Quantum support vector machine for big data classification", Physical Review Letters, Jul. 2013, pp. 1-5.
Wiebe, N. et al., "Quantum Algorithms for Nearest-Neighbor Methods for Supervised and Unsupervised Learning", Quantum Information & Computation, Mar. 2015, pp. 1-31, vol. 15, Issue 3-4.
Schuld, M. et al., "An introduction to quantum machine learning", Contemporary Physics, Sep. 10, 2014, pp. 1-19.
Möttönen, M. et al., "Transformation of quantum states using uniformly controlled rotations", Quantum Information & Computation, Sep. 2005, pp. 1-5, vol. 5, Issue 6.
Lloyd, S., "Least Squares Quantization in PCM", IEEE Transaction on Information Theory, Mar. 1982, pp. 129-137, vol. IT-28, No. 2.
Preskill, J., "Quantum Computing in the NISQ era and beyond", Quantum 2, Jul. 30, 2018, pp. 1-20.
Aimeur, E. et al., "Quantum speed-up for unsupervised learning", Machine Language, Feb. 2013, pp. 261-287, vol. 90, Issue 2.
Aimeur, E. et al., "Machine Learning in a Quantum World", Conference of the Canadian Society for Computational Studies of Intelligence, Jun. 2006, pp. 431-442.
Kopczyk, D., "Quantum machine learning for data scientists", Quantum Physics, Apr. 25, 2018, pp. 1-46.
Durr, C. et al., "A quantum algorithm for finding the minimum", Mathematics, Physics, Computer Science, Jul. 18, 1996, pp. 1-2.
Elisseeff, A. et al., "A kernel method for multi-labelled classification", 14th International Conference on Neural Information Processing Systems: Natural and Synthetic, Jan. 2001, pp. 681-687.
Barenco, A., et al., "Elementary gates for quantum computation", Physical Review A, Mar. 23, 1995 pp. 1-31, vol. 52.
Khan, S., et al., "K-Means Clustering on Noisy Intermediate Scale Quantum Computers", Sep. 26, 2019, pp. 1-12.

* cited by examiner

CLASSIFYING DATA BY MANIPULATING THE QUANTUM STATES OF QUBITS

TECHNICAL FIELD

Examples of the present disclosure relate to classifying data, such as for example determining a cluster for a data vector. In some examples, a quantum computing device may be used.

BACKGROUND

Machine learning may be used in many areas of technology. For example, automation of management in communications networks may use machine learning algorithms and techniques including, for example, support vector machine (SVM), K-Means, Linear regression and other examples. In some examples, machine learning techniques may predict when a cell may encounter a load issue or a failure, or may detect or predict other anomalies. Machine learning algorithms may be both computationally intensive and required to handle large volumes of data. This has led to interest in specialized accelerators for such techniques. Quantum computing devices are an example, and using quantum computing devices to execute machine learning algorithms may require redesign of those algorithms to exploit the principles of quantum mechanics.

Literature has been produced that relates to Quantum Machine Learning (QML), such as for example in reference [1]. QML techniques are being developed that can solve machine learning (ML) problems faster than the best known classical algorithms for the same problems. Supervised (e.g. support vector machines), un-supervised (e.g. clustering) and reinforcement quantum machine learning techniques have been proposed that provide exponential speed-ups as compared to their classical counterparts, such as for example in references [2-5].

Quantum algorithms may be executed on real quantum computing devices, but there are certain limitations to what can be achieved with current noisy quantum computing devices. Noisy quantum computing devices, which may also be termed as Noisy Intermediate Scale Quantum computing devices (NISQ), may have insufficient fault tolerance [6]. Furthermore, qubits on current quantum devices have low coherence times and the superposition of the qubits is quickly lost, which may lead to decoherence and errors in the computation [7]. Algorithm implementations with shallow depth quantum circuits may provide better results on current term noisy quantum devices, considering that the complexity of an implementation is measured as the total number of elementary gates required to build the circuit [8].

K-means clustering [10] is an unsupervised machine learning algorithm that groups together M observations into k clusters, making sure intra cluster variance is minimized. Centroids of each cluster are recomputed and datapoints are reassigned iteratively until convergence is achieved. Time complexity of the classical version of the algorithm is dependent on the number of features N in the input vectors and total number of datapoints M.

Figure 1:
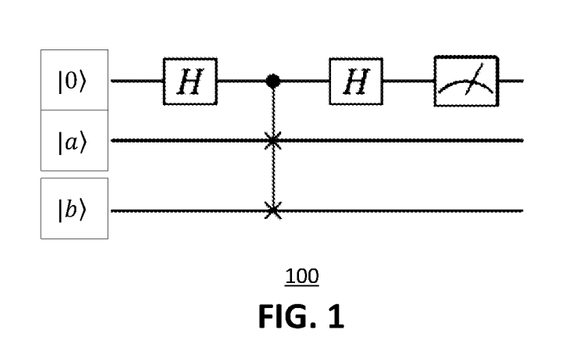
FIG. 1 shows an example of a quantum circuit for a SwapTest quantum subroutine.
Figure 2:
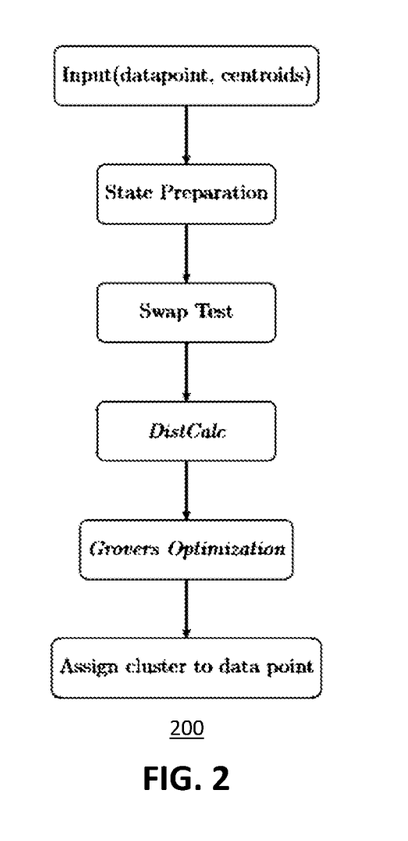
FIG. 2 is a flow chart of an example of a process for assigning cluster to a data point.

Quantum k means clustering may provide an exponential speed increase for very high dimensional input vectors. The speed increase arises due to the observation that only log N qubits are required to load a vector with N dimensions. One existing solution of the quantum k means algorithm is described in reference [11]. It uses three different quantum subroutines to perform the k-means clustering: SwapTest, DistCalc and Grover's Optimization. The SwaptTest subroutine, that was first used in reference [12], measures the overlap between two quantum states $\langle a|b \rangle$ based on the measurement probability of the control qubit in state $|0\rangle$. States $|a\rangle$ and $|b\rangle$ can be unknown prior to running the subroutine, and only a measurement on the control qubit is required. The quantum circuit 100 for SwapTest is shown in FIG. 1. The states $|a\rangle$ and $|b\rangle$ consists of n qubits each. They are either prepared using amplitude encoding as in references [13,14] or they can be loaded directly from Quantum Random Access Memory (QRAM) [15]. The overlap is then calculated by performing a measurement on the control qubit. The overlap calculated from SwapTest is then used in the DistCalc routine that is described in reference [16] to calculate k distances to each cluster centroid. Grover's Optimization [17] is based on Grover's algorithm to find the index of the minimum element, which is then used to find the nearest centroid. The whole process 200 for assigning cluster to one data point is displayed as a flowchart in FIG. 2. This is repeated for each data point in the dataset.

Another solution proposed in reference [9] uses quantum interference to solve the classification problem, but can also be used to implement a quantum k means algorithm.

The main idea of the distance-based classifier is to use quantum interference to compute a distance measure for the classification. The distance measure is calculated between a test vector (e.g. a vector to be classified) and all training vectors. This distance measure is then used for classification. The reference [9] describes a supervised binary classifier which can be summarized as follows: Given a training dataset $D=\{(x^1, y^1) \ldots (x^M, y^M)\}$, with M training vectors having N dimensions $x^m \in \mathbb{R}^N$, and their corresponding class labels $y^m \in \{-1,1\}$. The goal of the classifier is to assign a class label $y^t$ to a test vector $x^t$. The classifier implemented by the quantum interference circuit is given by:

$$y^t = \text{sgn}\left(\sum_{m=1}^{m} y^m \left[1 - \frac{1}{4M}|x^t - x^m|^2\right]\right)$$

This is an example of a kernel method [18,19] where the distance measure $$1 - \frac{1}{4M}|x^t - x^m|^2$$

can be referred to as a kernel. The classifier uses a well-known amplitude encoding strategy to load the classical data into quantum states. For each normalized input vector $x_i$, the following corresponding quantum states would be obtained:

$$|\psi_{x^m}\rangle = \sum_{i=1}^{N} x_i^m |i\rangle$$

The classifier effectively creates entangled quantum states with amplitude encoding of M training vectors and M copies of the test vector. The Quantum states of the test vectors are entangled with the $|0\rangle$ state of the ancillary register and training vector states are entangled with the $|1\rangle$ state of the ancillary register. This gives the following wave function for the quantum encoding of the classifier:

$$|\psi\rangle = \frac{1}{\sqrt{2}}(|0\rangle|\psi_{x_{test}}\rangle + |1\rangle|\psi_{x^m}\rangle)$$

where $|\psi x^m\rangle$ is the combined quantum state of all the training input vectors. After state preparation, the classifier interferes test and training vectors using the Hadamard gate on the ancillary register, and the resulting quantum states provide the constructive interference on the $|0\rangle$ state of the ancillary register and destructive interference on the $|1\rangle$ state of the ancillary register. This can be expressed as follows:

$$|\psi\rangle = \sum_{m=1}^{M}(|0\rangle|\psi_{x^t+x^{\wedge}m}\rangle + |1\rangle|\psi_{x^t-x^m}\rangle)$$

Figure 3:
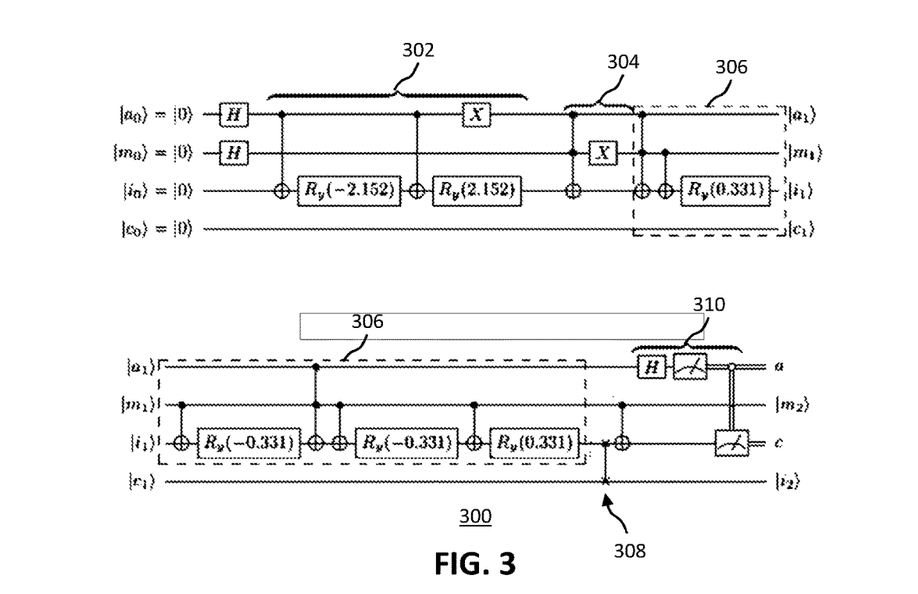
FIG. 3 shows an example of a quantum distance based classifier circuit.

From this final quantum state, the classifier only performs a selective measurement where the ancillary register is $|0\rangle$, and concerns only the constructive interference of the training and test vectors. The classification decision is taken where the interference is high. The quantum circuit that realizes this kernelized binary classifier as proposed by reference [9] is shown in FIG. 3, which shows an example of a quantum distance based classifier circuit 300. The quantum circuit 300 includes a first part 302 to load a test vector, a second part 304 to load a first training vector, and a third part 306 to load a second training vector. Also included is a fourth part 308 to flip the class label for the second training vector, and a fifth part 310 for interference and measurement.

The circuit 300 in FIG. 3 implements the specific binary classification problem of the iris dataset [20] where only two features for each sample vector are taken. There are two stages in the circuit 300: State Preparation and Interference. State Preparation loads two training vectors (parts 304 and 306) and one test vector (part 302), along with a copy of a test vector, on the data qubit $|i_0\rangle$ entangled with the aniclla qubit $|a_0\rangle$, index qubit $|m_0\rangle$ and class qubit $|c_0\rangle$. This state preparation continues until the fourth part 308. The fifth part 310 constitutes a Hadamard gate applied to the ancilla qubit $|a_0\rangle$. This step performs the actual interference between test and training vectors that were loaded in the entangled state. One copy of the test vector interferes with the first training vector, and the other copy interferes with the second training vector. A measurement is performed at the end of the circuit to read out the values of the qubits.

SUMMARY

One aspect of this disclosure provides a method of classifying data. The method comprises manipulating quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device. The magnitude of the angle between the modified first copy of the test vector and the modified first training vector is equal to the magnitude of the angle between the first copy of the test vector and the first training vector, and where the magnitude of the angle between the modified second copy of the test vector and the modified second training vector is equal to the magnitude of the angle between the second copy of the test vector and the second training vector. The method also comprises performing quantum interference between the modified first copy of the test vector and the modified second copy of the test vector, and the modified first training vector and the modified second training vector, to provide modified quantum states of the qubits, performing a measurement on one or more of the qubits, and classifying the test vector based on the measurement.

A further aspect of this disclosure provides a method of determining a cluster for a test vector from at least three clusters. Each cluster is associated with a respective training vector in a list of training vectors. The method comprises:
a) selecting first and second training vectors from the list of training vectors,
b) determining a closest vector of the first and second training vectors to the test vector,
c) removing the other of the first and second training vectors from the list of training vectors, and
d) repeating steps (a)-(c) until the list of vectors comprises a single vector; and
e) determining the cluster associated with the single vector.

A still further aspect of this disclosure provides apparatus for classifying data. The apparatus comprises a processor and a memory. The memory contains instructions executable by the processor such that the apparatus is operable to manipulate quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device, wherein the magnitude of the angle between the modified first copy of the test vector and the modified first training vector is equal to the magnitude of the angle between the first copy of the test vector and the first training vector, and where the magnitude of the angle between the modified second copy of the test vector and the modified second training vector is equal to the magnitude of the angle between the second copy of the test vector and the second training vector; perform quantum interference between the modified first copy of the test vector and the modified second copy of the test vector, and the modified first training vector and the modified second training vector, to provide modified quantum states of the qubits; perform a measurement on one or more of the qubits; and classify the test vector based on the measurement.

Another aspect of this disclosure provides apparatus for determining a cluster for a test vector from at least three clusters. The apparatus comprises a processor and a memory. The memory contains instructions executable by the processor such that the apparatus is operable to:
a) select first and second training vectors from the list of training vectors,
b) determine a closest vector of the first and second training vectors to the test vector,
c) remove the other of the first and second training vectors from the list of training vectors,
d) repeat steps (a)-(c) until the list of vectors comprises a single vector; and
e) determine the cluster associated with the single vector.

An additional aspect of this disclosure provides apparatus for classifying data. The apparatus is configured to manipulate quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device, wherein the magnitude of the angle between the modified first copy of the test vector and the modified first training vector is equal to the magnitude of the angle between the first copy of the test vector and the first training vector, and where the magnitude of the angle between the modified second copy of the test vector and the modified second training vector is equal to the magnitude of the angle between the second copy of the test vector and the second training vector. The apparatus is also configured to perform quantum interference between the modified first copy of the test vector and the modified second copy of the test vector, and the modified first training vector and the modified second training vector, to provide modified quantum states of the qubits, perform a measurement on one or more of the qubits, and classify the test vector based on the measurement.

A further aspect of this disclosure provides apparatus for determining a cluster for a test vector from at least three clusters. The apparatus is configured to:
a) select first and second training vectors from the list of training vectors,
b) determine a closest vector of the first and second training vectors to the test vector,
c) remove the other of the first and second training vectors from the list of training vectors,
d) repeat steps (a)-(c) until the list of vectors comprises a single vector; and
e) determine the cluster associated with the single vector.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computing devices.

Nodes that communicate using the air interface also have suitable radio communications circuitry. Moreover, where appropriate the technology can additionally be considered to be embodied entirely within any form of computing device-readable memory, such as solid-state memory, magnetic disk, or optical disk containing an appropriate set of computing device instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Quantum computing devices may be performance-limited by the coherence time of the qubits. This, in turn, implies that only short depth circuits can be executed. Quantum circuit simulators may also be executed on classical computing devices to simulate the quantum algorithms, but they are also limited in processing power by the bit limitation of the classical computing devices.

The existing solution for quantum distance-based classification (e.g. quantum circuit 300 shown in FIG. 3), although it provides a framework for using interference for distance-based classification, is designed for experimental implementation of a specific example from the Iris Dataset [20]. The second step 304 cannot load an arbitrary training vector, which is preferred for a generalized solution. However, using the proposed framework to prepare an arbitrary state for any input vectors requires more quantum operations, which results in a longer depth quantum circuit. A longer depth quantum circuit may not perform well on current noisy quantum computing devices and may be prone to providing inaccurate results.

Embodiments as disclosed herein may provide a classification method, a clustering method or a k-means clustering algorithm, for example through quantum interference using a quantum circuit with a reduced number of quantum operations and a shorter quantum circuit. Embodiments of this disclosure may be based on the finding that quantum interference can be achieved by preparing interfering quantum states with angular difference equal to the interfering input vectors.

In some embodiments, a classical computing device may prepare and maintain the state of the method or algorithm, while a quantum computing device may execute the quantum interference circuit and return the interference pattern probabilities to the classical computing device. In some embodiments, the input to an example algorithm is K (number of clusters) and a set of input data points (e.g. test vectors). The first step of the algorithm is to generate K centroids randomly. After this an outer loop is executed, which assigns a cluster to each data point. Inside this outer loop, in some examples, in an inner loop, centroids compete (two at a time) with each other to acquire the datapoint into their cluster. In each round of the inner loop, the centroid which is closer to the data point wins and takes part in the next round. In some examples, the classical computing device maintains a list (e.g. a dictionary win_dict) that stores or indicates all the centroids that won the last round (or previous rounds) or centroids that are yet to take their turn. The list may be initialized with K centroids. Two centroids ($c_i$, $c_j$) are selected from the list. The centroids may be selected in any suitable manner, even randomly. Along with the test vector (ti), the selected centroids (which may for example be vectors) are loaded into the quantum interference circuit. The quantum interference circuit is executed on a quantum computing device and interference probabilities are returned to the classical computing device. The classical computing device in some examples filters out the constructive interference probabilities. The nearer centroid is found based on the probability of the LSB qubit. If the probability of state $|0\rangle$ is high then a first centroid (e.g. $c_i$) wins, else the other centroid (e.g. $c_j$) wins. Win in this context means that the centroid is closer to the datapoint. The winning centroid is then pushed back into the list (or is maintained in the list, while the other centroid is removed or marked as a non-winning or losing centroid, and is excluded from further rounds). This process is repeated until there is only one centroid remaining in the list (excluding those centroids marked as non-winning or losing). The input data point is assigned to the cluster of the remaining centroid. The whole process (apart from the initial random generation of centroids) is repeated for all the data points in the input data set. After assigning clusters to each datapoint, centroids may in some examples be recomputed by averaging all datapoints in respective clusters. In some examples, these new centroids may then be used to perform the cluster assignment again for all data points (e.g. repeat the above process without the random generation of centroids). This may be done for example a predetermined number of times or until there are no changes in cluster assignments for any of the data points.

Figure 4:
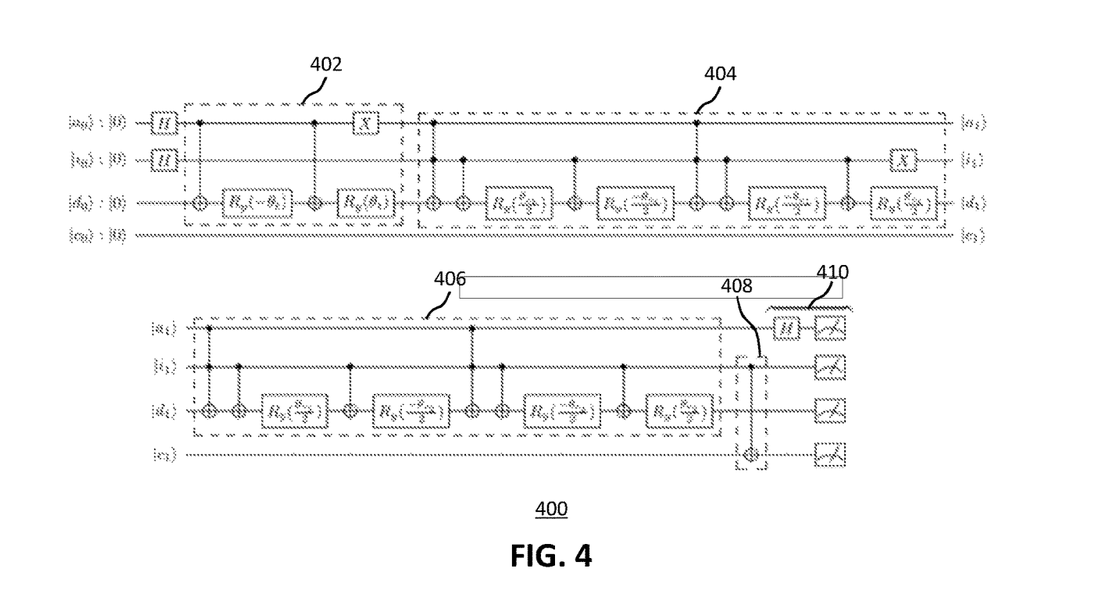
FIG. 4 shows an example of a quantum distance-based classifier circuit designed to load arbitrary input vectors.

The distance-based classifier [9] briefly explained above can be used to implement a quantum version of the K means algorithm, with arbitrary training vectors. An example of a quantum distance-based classifier circuit 400 designed to load arbitrary training vectors is shown in FIG. 4. The circuit 400 includes a first part 402 for loading copies of the test vector, and a second part 404 for loading the first training vector. The second part 404 includes four controlled rotation gates. A third part 406 of the circuit 400 loads the second training vector, and also includes four controlled rotation gates. The circuit 400 includes a fourth part 408 to flip the class label for the second training vector, and a fifth part 410 for interference and measurement. This quantum circuit 400 has an increased depth compared to the circuit 300 of FIG. 3, as the circuit 400 uses controlled rotations for both arbitrary training vectors. Embodiments as disclosed herein relate to an optimization strategy that may reduce the depth of a quantum circuit.

Embodiments as disclosed herein propose a quantum circuit and method. These may in some examples use the same number of qubits as in [9], which is four, while reducing the depth of the quantum circuit. The desired quantum state required by the quantum interference to perform the classification is given by, for example:

$$|\psi\rangle = \frac{1}{\sqrt{2}}(|0\rangle|a\rangle + |1\rangle|b\rangle) \qquad (1)$$

Here, $|a\rangle$ is the quantum state for of the test vector and $|b\rangle$ is the quantum state of the training vectors. A Hadamard gate applied to the ancilla qubit of this quantum state performs the interference between the test vector $|a\rangle$ and training vectors $|b\rangle$. This is the desired quantum state where $|a\rangle$ is entangled with the $|0\rangle$ state of ancilla qubit and $|b\rangle$ is entangled with the $|1\rangle$ state of the ancilla qubit. Another valid quantum state that would provide the same interference probability pattern can be written as follows:

$$|\psi\rangle = \frac{1}{\sqrt{2}}(|0\rangle|a_1\rangle + |1\rangle|b_1\rangle) \qquad (2)$$

Which is similar to the state in eq. (1), but here $|a_1\rangle$ and $|b_1\rangle$, the corresponding quantum states of test and training vectors respectively, do not represent the input vectors instead they represent a new configuration of the input vectors. This new configuration is valid for quantum interference if the following equation holds true:

$$|\theta_{|a\rangle} - \theta_{|b\rangle}| = |\theta_{|a_1\rangle} - \theta_{|b_1\rangle}| \qquad (3)$$

In other words, the angle between $|a_1\rangle$ and $|b_1\rangle$ is the same as between $|a\rangle$ and $|b\rangle$. In some example embodiments, therefore, the state shown in equation eq. (2) that loads a new configuration of the test and training vectors is prepared. This quantum state can be achieved with a shorter circuit than that shown in FIG. 4 in some examples.

Figure 5:
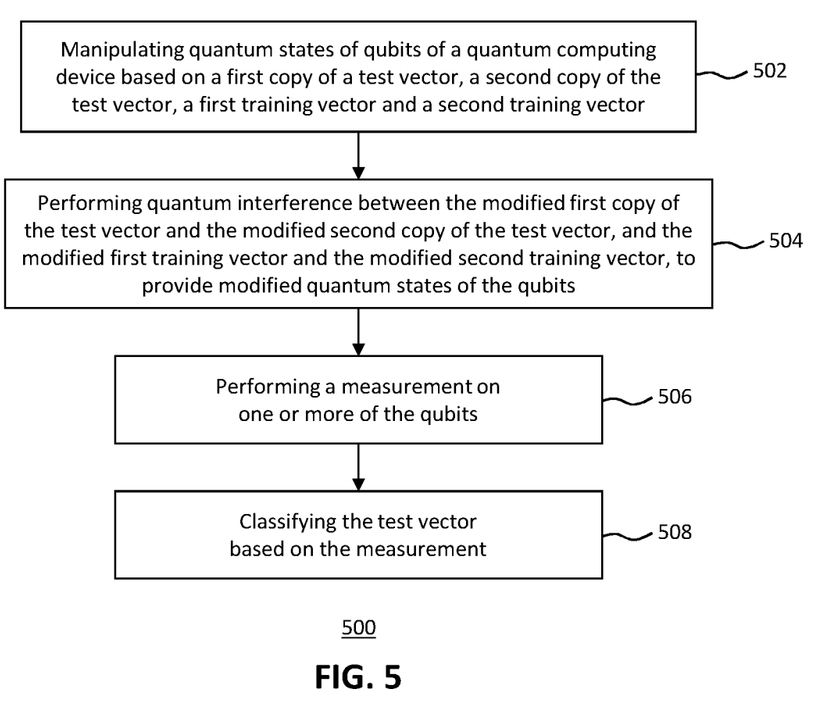
FIG. 5 is a flow chart of an example of a method of classifying data.

FIG. 5 is a flow chart of an example of a method of classifying data. The method comprises, in step 502, manipulating quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device, wherein the magnitude of the angle between the modified first copy of the test vector and the modified first training vector is equal to the magnitude of the angle between the first copy of the test vector and the first training vector, and where the magnitude of the angle between the modified second copy of the test vector and the modified second training vector is equal to the magnitude of the angle between the second copy of the test vector and the second training vector.

Thus, embodiments as disclosed herein may allow certain vectors to be modified during the loading process, however angular difference between vectors may be preserved.

Figure 6:
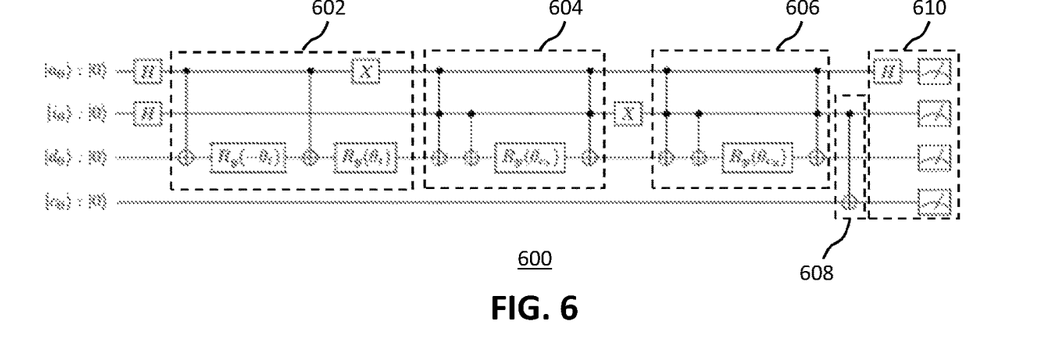
FIG. 6 is an example of a quantum circuit that may be used with the method of FIG. 5.

FIG. 6 is an example of a quantum circuit 600 that may be used with the method 500 of FIG. 5. The circuit 600 includes four qubits, $|a_0\rangle$, $|d_0\rangle$, $|i_0\rangle$ and $|c_0\rangle$, which are all initially $|0\rangle$. The quantum circuit 600 includes a first part 602 to load first and second copies of a test vector (which has angle $\theta_t$ in polar coordinates). The first part 602 comprises a controlled NOT (CNOT) gate on $|d_0\rangle$ controlled by $|a_0\rangle$, a rotation by $-\theta_t$ on $|d_0\rangle$, a second CNOT gate on $|d_0\rangle$ controlled by $|a_0\rangle$, and a second rotation by $\theta_t$ on $|d_0\rangle$. There is also a NOT gate on $|a_0\rangle$ following the second CNOT gate.

The quantum circuit 600 also includes a second part 604 for loading a first training vector. The second part 604 includes a controlled-controlled-NOT (CCNOT), or Toffoli, gate on $|d_0\rangle$ controlled by $|a_0\rangle$ and $|i_0\rangle$, a CNOT gate on $|d_0\rangle$ controlled by $|i_0\rangle$, a rotation on $|d_0\rangle$ by a first training vector angle $\theta_{c1}$, and a second CCNOT gate on $|d_0\rangle$ controlled by $|a_0\rangle$ and $|i_0\rangle$. The second part 604 is followed by a NOT gate on $|i_0\rangle$.

The quantum circuit also includes a third part 606 for loading a second training vector. The third part 606 includes a CCNOT gate on $|d_0\rangle$ controlled by $|a_0\rangle$ and $|i_0\rangle$, a CNOT gate on $|d_0\rangle$ controlled by $|i_0\rangle$, a rotation on $|d_0\rangle$ by a second training vector angle $\theta_{c2}$, and a second CCNOT gate on $|d_0\rangle$ controlled by $|a_0\rangle$ and $|i_0\rangle$. The quantum circuit includes a fourth part 608 to flip the class label for the second training vector, and comprises a CCNOT gate on $|c_0\rangle$ controlled by $|i_0\rangle$. Finally, this is followed by a fourth part 610 for interference and measurement of the four qubits, and includes a Hadamard gate on $|a_0\rangle$. The quantum circuit 600 is merely an example of a quantum circuit that could be used to implement at least part of the method 500.

Referring back to FIG. 5, the method 500 proceeds to step 504, comprising performing quantum interference between the modified first copy of the test vector and the modified second copy of the test vector, and the modified first training vector and the modified second training vector, to provide modified quantum states of the qubits. Next, in step 506, a measurement is performed on one or more of the qubits, and then step 508 comprises classifying the test vector based on the measurement, e.g. based on the measured quantum states of the qubits.

In some examples, the step of performing quantum interference between the modified first copy of the test vector and the modified second copy of the test vector, and the modified first training vector and the modified second training vector, comprises performing quantum interference between the modified first copy of the test vector and the modified first training vector, and performing quantum interference between the modified second copy of the test vector and the modified second training vector.

The step of manipulating the quantum states of the qubits in some examples may comprise performing a first rotation operation on a first qubit of the qubits by a first angle (e.g. $-\theta_t$) based on the test vector, and performing a second rotation operation on the first qubit by a second angle (e.g. $\theta_t$) based on the test vector. These may comprise for example the rotations in the first part 602 of the quantum circuit 600 shown in FIG. 6. Additionally, in some examples, the step of manipulating the quantum states of the qubits may comprise performing a third rotation operation on the first qubit by a third angle (e.g. $\theta_{c1}$) based on the first training vector, such as for example in the second part 604 of the quantum circuit 600; and performing a fourth rotation operation on the first qubit by a fourth angle (e.g. $\theta_{c2}$) based on the second training vector.

The method 500 may in some examples comprise performing a first controlled NOT, CNOT, operation on the first qubit that is controlled by a second qubit of the qubits, wherein the CNOT operation is performed between the first and second rotation operations. This may correspond for example to the second CNOT gate in the first part 602 of the quantum circuit 600. Additionally or alternatively, the method 500 may in some examples comprise performing a second controlled NOT, CNOT, operation on the first qubit that is controlled by a third qubit of the qubits, wherein the CNOT operation is performed between the second and third rotation operations. This may correspond for example to the first CNOT gate in the second part 604 of the quantum circuit 600. Additionally or alternatively, the method 500 may in some examples comprise performing a third controlled NOT, CNOT, operation on the first qubit that is controlled by the third qubit of the qubits, wherein the CNOT operation is performed between the third and fourth rotation operations. This may correspond for example to the first CNOT gate in the third part 606 of the quantum circuit 600. The initial state of the first qubit may be $|0\rangle$. The third rotation operation and the fourth rotation operation may in some examples modify the first copy of the test vector to form the modified first copy of the test vector and modify the second copy of the test vector to form the modified second copy of the test vector. This may for example preserve the angle between vectors.

In some examples, manipulating the quantum states of qubits of a quantum computing device comprises one or more of performing a rotation on the first qubit using a first quantum rotation gate based on the first copy of the test vector, performing a rotation using a second quantum rotation gate based on the second copy of the test vector, performing a rotation on the first qubit using a third quantum rotation gate based on the first training vector, and performing a rotation on the first qubit using a fourth quantum rotation gate based on the second training vector. In some examples, only one respective rotation is performed for each of the first and second training vectors. Thus, for example, only one rotation gate may be used for each of the training vectors, even though they are both arbitrary vectors (though in embodiments as described herein, any of the training and test vectors may be unit length vectors). This may reduce the depth of the quantum circuit compared to for example the circuit 400 shown in FIG. 4.

In some examples, manipulating the quantum states of the qubits, performing quantum interference, performing a measurement on one or more of the qubits and classifying the test vector based on the measurement comprise performing a quantum k-means algorithm. In other words, for example, the method 500 may implement the quantum k-means algorithm in some embodiments.

Figure 7:
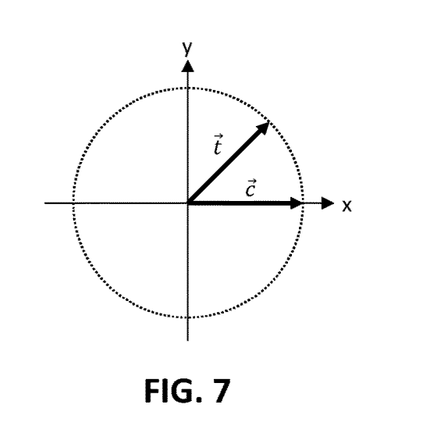
FIG. 7 shows an example of a configuration of a test vector and a training vector.
Figure 8:
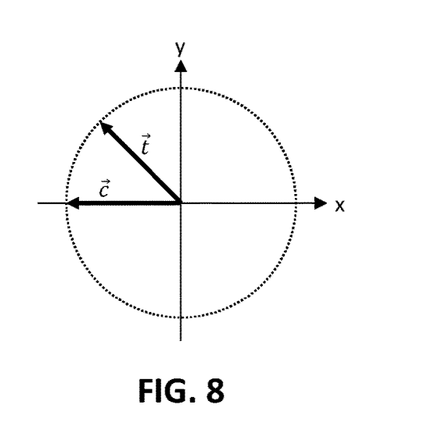
FIG. 8 shows an example of another configuration of a test vector and a training vector.

A specific example will now be described. An example training vector has 0° rotation from the x axis and an example test vector has 45° rotation. The angular difference between them in this example would be 45° as shown in FIG. 7. This is how the circuit 400 of FIG. 4 may load the test and training vectors in the entangled quantum states. However, to achieve the same interference pattern at the end of the quantum circuit it may not be necessary to load the vectors into the quantum states that directly correspond to their input states. The same interference pattern may be achieved if the angle between test and training vectors is equal at the end of the state preparation. For instance, FIG. 8 shows an example of a valid configuration that adheres to the constraint in equation (3) above. Both configurations shown in FIGS. 7 and 8 would yield the same interference pattern probabilities after measurement.

Figure 9:
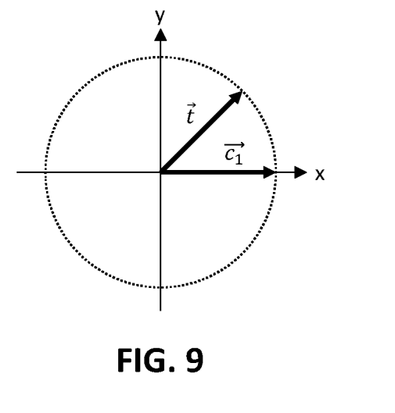
FIG. 9 shows an example of the configuration of a test vector and a first training vector.

This equivalence of interference probability patterns can be shown through standard vector notation. In this example, the original configuration of the vectors is: test vector t=(0.707,0.707) and training vector c=(1,0) from FIG. 7, and the alternative state configuration from FIG. 9 is: test vector t=(−0.707,0.707) and training vector c=(−1,0). The vector representation of this example is shown in equations 4 and 5 below:

$$\begin{bmatrix} 0.707 \\ 0.707 \\ 1 \\ 0 \end{bmatrix} \otimes N \rightarrow \begin{bmatrix} 0.5 \\ 0.5 \\ 0.707 \\ 0 \end{bmatrix} \otimes H \otimes M = \begin{bmatrix} 0.725 \\ 0.125 \\ 0.021 \\ 0.13 \end{bmatrix} \quad (4)$$

$$\begin{bmatrix} -0.707 \\ 0.707 \\ -1 \\ 0 \end{bmatrix} \otimes N \rightarrow \begin{bmatrix} -0.5 \\ 0.5 \\ -0.707 \\ 0 \end{bmatrix} \otimes H \otimes M = \begin{bmatrix} 0.725 \\ 0.125 \\ 0.021 \\ 0.13 \end{bmatrix} \quad (5)$$

where N represents a normalization operator, which calculates a unit vector $\hat{v}$ for a given vector $\vec{v}$ $$\hat{v} = \frac{\vec{v}}{\|\vec{v}\|}$$

H represents a Hadamard operation on the most significant qubit. A two qubit Hadamard operation is represented as:

$$\frac{1}{\sqrt{2}} \begin{bmatrix} 1 & 0 & 1 & 0 \\ 0 & 1 & 0 & 1 \\ 1 & 0 & -1 & 0 \\ 0 & 1 & 0 & -1 \end{bmatrix}$$

and M is a measurement operation. After the measurement, both configurations in equations 4 and 5 yield same probabilities for each quantum state, as shown above.

This finding relating to quantum interference pattern probabilities is used in embodiments of this disclosure to reduce the depth of the circuit. The state preparation part of the quantum interference circuit of embodiments (e.g. the circuit 600 of FIG. 6) is not constrained to load the exact states of the input vectors. It is designed to load the interfering copies of the input vectors with the same relative angular difference. The goal of loading the vectors with same relative angular difference is reached in certain examples by making the input vectors undergo a certain set of quantum operations within the state preparation stage. The operations that are performed on each one of the input vectors are outlined below. Note that the initial state of each vector is $$\begin{pmatrix} 1 \\ 0 \end{pmatrix},$$

meaning it lies flat on x axis.

$$t : R_y(\theta_t) \otimes X \otimes R_y\left(\frac{\theta_{c_1}}{2}\right) \otimes R_y\left(\frac{\theta_{c_2}}{2}\right) \quad (6)$$

$$t' : R_y(\theta_t) \otimes R_y\left(\frac{\theta_{c_1}}{2}\right) \otimes X \otimes R_y\left(\frac{\theta_{c_2}}{2}\right) \quad (7)$$

$$c_1 : X \otimes R_y\left(-\frac{\theta_{c_1}}{2}\right) \otimes R_y\left(\frac{\theta_{c_2}}{2}\right) \quad (8)$$

$$c_2 : R_y\left(\frac{\theta_{c_1}}{2}\right) \otimes X \otimes R_y\left(-\frac{\theta_{c_2}}{2}\right) \quad (9)$$

Here t is the test vector and t' is its copy. $c_1$ and $c_2$ are two training vectors. X is a simple quantum NOT operation and $R_y$ represents the rotation operation. In this case, t interferes with $c_1$ and t' interferes with $c_2$. Hence, the angular difference between t and $c_1$ and the angular difference between t' and $c_2$ in the circuit 400 of FIG. 4 should be equal to the corresponding angles in embodiments of this disclosure (e.g. in the circuit 600 of FIG. 6, and/or as achieved using the method 500 of FIG. 5).

Figure 10:
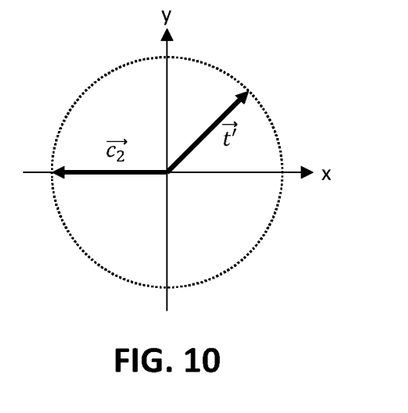
FIG. 10 shows an example of the configuration of a copy of the test vector and a second training vector.
Figure 11:
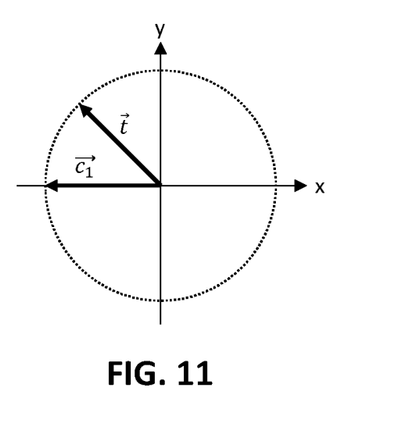
FIG. 11 shows an example of the configuration of a modified first copy of a test vector and a modified first training vector.
Figure 12:
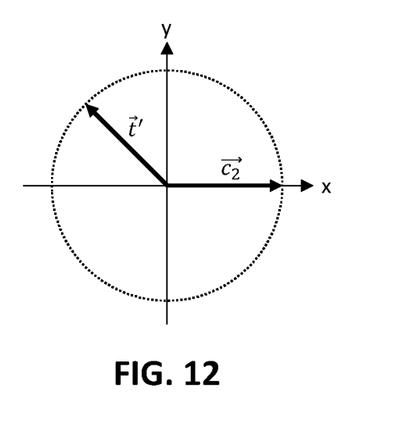
FIG. 12 shows an example of the configuration of a modified second copy of a test vector and a modified second training vector.
Figure 13:
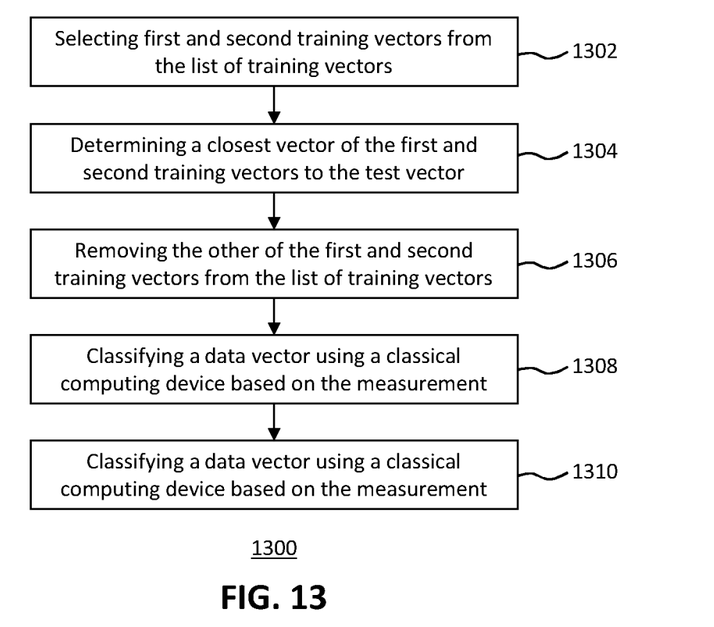
FIG. 13 is a flow chart of an example of a method of determining a cluster for a test vector from at least three clusters.

In another example, such as for example in embodiments of this disclosure, FIG. 9 shows an example of the configuration of a test vector t and a training vector $c_1$, similar to those shown in FIG. 7. However, while FIG. 9 shows the final (and initial) configuration of the vectors in a circuit such as for example the circuit 400 of FIG. 4, FIG. 9 shows the input vectors in embodiments of this disclosure. Similarly, FIG. 10 shows an example of the configuration of a copy of the test vector t' and a second training vector $c_2$. FIG. 11 shows the configuration of the vectors from FIG. 9 having been loaded (e.g. in the circuit 600 of FIG. 6 or by the method 500 of FIG. 5) and having therefore undergone the transitions shown in equations (6)-(9) above. Similarly, FIG. 12 shows the configuration of the vectors from FIG. 10 having been loaded (e.g. in the circuit 600 of FIG. 6 or by the method 500 of FIG. 5) and having therefore undergone the transitions shown in equations (6)-(9) above. Thus for example the vectors in FIG. 11 may represent a modified first copy of a test vector and a modified first training vector, whereas the vectors in FIG. 12 may represent a modified second copy of the test vector and a modified second training vector. The examples disclosed above, such as for example the quantum k means algorithm, can only group data (e.g. test vectors) into two clusters, as the examples given only load two training vectors. Therefore, other embodiments propose an algorithm (that may use the above-described examples or other examples) to perform multi-cluster quantum k-means using two or more clusters and, where for example a quantum circuit is used, using a constant size circuit regardless of the number of clusters. FIG. 13 shows one example of a method 1300 of determining a cluster for a test vector from at least three clusters, each cluster associated with a respective training vector (e.g. centroid) in a list of training vectors. In some examples, the list of training vectors may first be initialized as a list of random vectors or centroids, for example as suggested above. The method 1300 comprises, in step 1302, selecting first and second training vectors from the list of training vectors, and in step 1304, determining a closest vector of the first and second training vectors to the test vector. This may be done in any suitable manner, including using any of the methods and/or circuits disclosed herein (e.g. methods of classifying the test vector based on the first and second training vectors), such as k-means or quantum k-means, and/or by using a quantum computing device. At least some other steps of the method 1300 may be implemented on a classical computing device in some examples. Next, in step 1306, the method 1300 comprises removing the other of the first and second training vectors from the list of training vectors. This may comprise actually removing the other vector (also referred to as the non-winning or losing training vector) from the list, or alternatively marking or flagging it such that it is not selected again. Then, step 1308 of the method 1300 comprises repeating steps 1302-1306 until the list of vectors comprises a single vector. Finally, step 1310 comprises determining the cluster associated with the single vector (e.g. the remaining vector). Thus, for example, the test vector has been classified into a cluster associated with the remaining vector in the list from three or more clusters.

Figure 14:
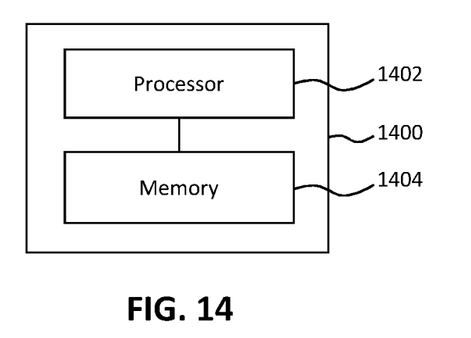
FIG. 14 is a schematic of an example of apparatus for classifying data.

FIG. 14 is a schematic of an example of apparatus 1400 for classifying data. The apparatus 1400 comprises processing circuitry 1402 (e.g. one or more processors) and a memory 1404 in communication with the processing circuitry 1402. The memory 1404 contains instructions executable by the processing circuitry 1402. In one embodiment, the memory 1404 contains instructions executable by the processing circuitry 1402 such that the apparatus 1400 is operable to manipulate quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device, wherein the magnitude of the angle between the modified first copy of the test vector and the modified first training vector is equal to the magnitude of the angle between the first copy of the test vector and the first training vector, and where the magnitude of the angle between the modified second copy of the test vector and the modified second training vector is equal to the magnitude of the angle between the second copy of the test vector and the second training vector, perform quantum interference between the modified first copy of the test vector and the modified second copy of the test vector, and the modified first training vector and the modified second training vector, to provide modified quantum states of the qubits, perform a measurement on one or more of the qubits, and classify the test vector based on the measurement. In some examples, the memory 1404 contains instructions executable by the processing circuitry 1402 such that the apparatus 1400 is operable to carry out the method 500 shown in FIG. 5 and/or described above.

Figure 15:
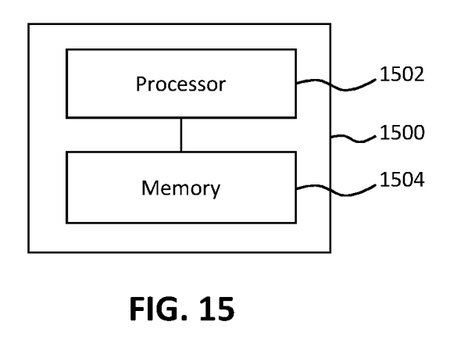
FIG. 15 is a schematic of an example of apparatus 1500 for determining a cluster for a test vector from at least three clusters.

FIG. 15 is a schematic of an example of apparatus 1500 for determining a cluster for a test vector from at least three clusters. The apparatus 1500 comprises processing circuitry 1502 (e.g. one or more processors) and a memory 1504 in communication with the processing circuitry 1502. The memory 1504 contains instructions executable by the processing circuitry 1502. In one embodiment, the memory 1504 contains instructions executable by the processing circuitry 1502 such that the apparatus 1500 is operable to:
 a) select first and second training vectors from the list of training vectors,
 b) determine a closest vector of the first and second training vectors to the test vector,
 c) remove the other of the first and second training vectors from the list of training vectors,
 d) repeat steps (a)-(c) until the list of vectors comprises a single vector; and
 e) determine the cluster associated with the single vector.
In some examples, the memory 1504 contains instructions executable by the processing circuitry 1502 such that the apparatus 1500 is operable to carry out the method 1300 shown in FIG. 13 and/or described above.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim or embodiment, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

REFERENCES

The following references are incorporated herein by reference.

[1] M. Schuld, I. Sinayskiy, and F. Petruccione, "An introduction to quantum machine learning," Contemporary Physics, vol. 56, no. 2, pp. 172-185, 2015. doi: 10.1080/00107514.2014.964942

[2] N. Wiebe, A. Kapoor, and K. M. Svore, "Quantum algorithms for nearest-neighbor methods for supervised and unsupervised learning," Quantum Information Computation, vol. 15, no. 3-4, p. 316-356, 2015

[3] E. Aimeur, G. Brassard, and S. Gambs, "Quantum speed-up for unsupervised learning," machine Learning, vol. 90, no. 2, pp. 261-287, 2013. doi: 10.1007/s10994-012-5316-5

[4] P. Rebentrost, M. Mohseni, and S. Lloyd, "Quantum support vector machine for big data classification," Physical Review Letters, vol. 113, no. 13, 2014. doi: 10.1103/PhysRevLett.113.130503

[5] V. Dunjko, Y.-K. Liu, X. Wu, and J. M. Taylor, "Exponential improvements for quantum-accessible reinforcement learning," ArXiv e-prints, 2017

[6] Preskill, "Quantum computing in the nisq era and beyond," Quantum, vol. 2, p. 79, 1995

[7] S. S. Tannu and M. K. Qureshi, "A case for variability-aware policies for nisq-era quantum computing devices," 2018

[8] A. Barenco, C. H. Bennett, R. Cleve, D. P. DiVincenzo, N. Margolus, P. Shor, T. Sleator, J. Smolin, and H. Weinfurter, "Elementary gates for quantum computation," Physical Review A, vol. 52, no. 5, pp. 3457-3467, 1995

[9] M. Schuld, M. Fingerhuth, and F. Petruccione, "Implementing a distance-based classifier with a quantum interference circuit," EPL (Europhysics Letters), vol. 119, no. 6, 2017. doi: 10.1209/0295-5075/119/60002

[10] S. P. Lloyd, "Least squares quantization in pcm," Information Theory, IEEE Transactions, pp. 129-137, 1982

[11] D. Kopczyk, "Quantum machine learning for data scientists," 2018. doi: arXiv: 1804.10068

[12] E. Kimeur, G. Brassard, and S. Gambs, "Machine learning in a quantum world," Advances in Artificial Intelligence, Springer, pp. 431-442, 2006.

[13] M. Mttnen, J. Vartiainen, V. Bergholm, and M. M. Salomaa, "Transformation of quantum states using uniformly controlled rotations," Quantum Information and Computation 5, pp. 467-473, 2005.
[14] R. D. P. Niemann and R. Wille, "Logic synthesis for quantum state generation." IEEE 46th International Symposium on Multiple-Valued Logic, Springer, pp. 247-252, 2016
[15] V. Giovannetti, S. Lloyd, and L. Maccone, "Quantum random access memory," Physical Review Letters, vol. 100, no. 16, pp. 1484-1509, 2008. doi: 10.1103/PhysRevLett. 100.160501
[16] S. Lloyd, M. Mohseni, and P. Rebentrost, "Quantum algorithms for supervised and unsupervised ma-chine learning," arXiv preprint 1307.0411, 2013
[17] C. Durr and P. Hoyer, "A quantum algorithm for finding the minimum," 1996. doi: arXiv: quant-ph/96070148
[18] V. A. Epanechnikov, "Non-parametric estimation of a multivariate probability density," Theory of Probability its Applications, pp. 153-158, 1969
[19] A. Elisseeff and J. Weston, "A kernel method for multi-labelled classification," Advances in neural information processing systems, pp. 681-687, 2002
[20] R. A. Fisher, "The use of multiple measurements in taxonomic problems," Annals of Eugenics, 7(2), pp. 179-188, 1936.

The invention claimed is:

1. A method of classifying data, the method comprising:
manipulating, using a quantum computing device, quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device, wherein manipulating the quantum states of the qubits comprises:
initializing vectors $$t, t', c_1, c_2 \text{ to } \begin{pmatrix} 1 \\ 0 \end{pmatrix};$$

and
performing the following manipulations using the quantum computing device to obtain, respectively, the modified first copy of the test vector, the modified second copy of the test vector, the modified first training vector, and the modified second training vector:

$$\text{on } t: R_y(\theta_t) \otimes X \otimes R_y\left(\frac{\theta_{c_1}}{2}\right) \otimes R_y\left(\frac{\theta_{c_2}}{2}\right);$$

$$\text{on } t': R_y(\theta_t) \otimes R_y\left(\frac{\theta_{c_1}}{2}\right) \otimes X \otimes R_y\left(\frac{\theta_{c_2}}{2}\right);$$

$$\text{on } c_1: X \otimes R_y\left(-\frac{\theta_{c_1}}{2}\right) \otimes R_y\left(\frac{\theta_{c_2}}{2}\right); \text{ and}$$

$$\text{on } c_2: R_y \otimes \left(\frac{\theta_{c_1}}{2}\right) \otimes X \otimes R_y\left(-\frac{\theta_{c_2}}{2}\right);$$

wherein:
X is a quantum NOT operation;
$R_y$ represents a rotation operator; and
angles $\theta_{c_1}, \theta_{c_2}$ represent the first and second training vectors;

performing, using the quantum computing device, quantum interference between the modified first copy of the test vector and the modified second copy of the test vector, and the modified first training vector and the modified second training vector, to provide modified quantum states of the qubits;
performing, using the quantum computing device, a measurement on one or more of the qubits; and
classifying the test vector based on the measurement.

2. The method of claim 1, wherein performing, using the quantum computing device, quantum interference between the modified first copy of the test vector and the modified second copy of the test vector, and the modified first training vector and the modified second training vector, comprises:
performing quantum interference between the modified first copy of the test vector and the modified first training vector; and
performing quantum interference between the modified second copy of the test vector and the modified second training vector.

3. The method of claim 1, wherein manipulating the quantum states of the qubits comprises:
performing a first rotation operation on a first qubit of the qubits by a first angle based on the test vector;
performing a second rotation operation on the first qubit by a second angle based on the test vector;
performing a third rotation operation on the first qubit by a third angle based on the first training vector; and
performing a fourth rotation operation on the first qubit by a fourth angle based on the second training vector.

4. The method of claim 3, wherein the method comprises performing a first controlled NOT (CNOT) operation on the first qubit that is controlled by a second qubit of the qubits, wherein the CNOT operation is performed between the first and second rotation operations.

5. The method of claim 3, wherein the method comprises performing a second controlled NOT (CNOT) operation on the first qubit that is controlled by a third qubit of the qubits, wherein the CNOT operation is performed between the second and third rotation operations.

6. The method of claim 3, wherein the method comprises performing a third controlled NOT (CNOT) operation on the first qubit that is controlled by the third qubit of the qubits, wherein the CNOT operation is performed between the third and fourth rotation operations.

7. The method of claim 3, wherein an initial state of the first qubit comprises $|0\rangle$.

8. The method of claim 3, wherein the third rotation operation and the fourth rotation operation modify the first copy of the test vector to form the modified first copy of the test vector and modify the second copy of the test vector to form the modified second copy of the test vector.

9. The method of claim 3, wherein the second angle is a negative of the first angle.

10. The method of claim 1, wherein manipulating the quantum states of qubits of a quantum computing device comprises:
performing a rotation on a first qubit using a first quantum rotation gate based on the first copy of the test vector;
performing a rotation using a second quantum rotation gate based on the second copy of the test vector;
performing a rotation on the first qubit using a third quantum rotation gate based on the first training vector; and/or performing a rotation on the first qubit using a fourth quantum rotation gate based on the second training vector.

11. The method of claim 10, further comprising performing only one respective rotation for each of the first and second training vectors.

12. The method of claim 1, wherein performing a measurement on one or more of the qubits comprises measuring a quantum state of the one or more qubits.

13. The method of claim 12, wherein classifying the test vector based on the measurement comprises classifying the test vector based on the quantum state.

14. The method of claim 1, wherein manipulating the quantum states of the qubits, performing quantum interference, performing a measurement on one or more of the qubits, and classifying the test vector based on the measurement comprise performing a quantum k-means algorithm.

15. A non-transitory computer readable recording medium storing a computer program product for classifying data, the computer program product comprising program instructions which, when run on processing circuitry of an apparatus, causes the apparatus to:

manipulate, using a quantum computing device, quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device, wherein to manipulate the quantum states of the qubits, the program instructions, when run on the processing circuitry of the apparatus, causes the apparatus to:

initialize vectors $$t, t', c_1, c_2 \text{ to } \begin{pmatrix} 1 \\ 0 \end{pmatrix};$$

and perform the following manipulations using the quantum computing device to obtain, respectively, the modified first copy of the test vector, the modified second copy of the test vector, the modified first training vector, and the modified second training vector:

$$\text{on } t: R_y(\theta_t) \otimes X \otimes R_y\left(\frac{\theta_{c_1}}{2}\right) \otimes R_y\left(\frac{\theta_{c_2}}{2}\right);$$

$$\text{on } t': R_y(\theta_t) \otimes R_y\left(\frac{\theta_{c_1}}{2}\right) \otimes X \otimes R_y\left(\frac{\theta_{c_2}}{2}\right);$$

$$\text{on } c_1: X \otimes R_y\left(-\frac{\theta_{c_1}}{2}\right) \otimes R_y\left(\frac{\theta_{c_2}}{2}\right); \text{ and}$$

$$\text{on } c_2: R_y \otimes \left(\frac{\theta_{c_1}}{2}\right) \otimes X \otimes R_y\left(-\frac{\theta_{c_2}}{2}\right);$$

wherein:
X is a quantum NOT operation;
$R_y$ represents a rotation operator; and
angles $\theta_{c_1}$, $\theta_{c_2}$ represent the first and second training vectors;

perform, using the quantum computing device, quantum interference between the modified first copy of the test vector and the modified second copy of the test vector, and the modified first training vector and the modified second training vector, to provide modified quantum states of the qubits;

perform, using the quantum computing device, a measurement on one or more of the qubits; and classify the test vector based on the measurement.

16. An apparatus for classifying data, the apparatus comprising processing circuitry;

memory containing instructions executable by the processing circuitry whereby the apparatus is operative to:

manipulate, using a quantum computing device, quantum states of qubits of a quantum computing device based on a first copy of a test vector, a second copy of the test vector, a first training vector and a second training vector, so as to load a modified first copy of the test vector, a modified second copy of the test vector, a modified first training vector and a modified second training vector onto the quantum computing device, wherein to manipulate the quantum states of the qubits, the apparatus is configured to:

initialize vectors $$t, t', c_1, c_2 \text{ to } \begin{pmatrix} 1 \\ 0 \end{pmatrix};$$

and perform the following manipulations using the quantum computing device to obtain, respectively, the modified first copy of the test vector, the modified second copy of the test vector, the modified first training vector, and the modified second training vector:

$$\text{on } t: R_y(\theta_t) \otimes X \otimes R_y\left(\frac{\theta_{c_1}}{2}\right) \otimes R_y\left(\frac{\theta_{c_2}}{2}\right);$$

$$\text{on } t': R_y(\theta_t) \otimes R_y\left(\frac{\theta_{c_1}}{2}\right) \otimes X \otimes R_y\left(\frac{\theta_{c_2}}{2}\right);$$

$$\text{on } c_1: X \otimes R_y\left(-\frac{\theta_{c_1}}{2}\right) \otimes R_y\left(\frac{\theta_{c_2}}{2}\right); \text{ and}$$

$$\text{on } c_2: R_y \otimes \left(\frac{\theta_{c_1}}{2}\right) \otimes X \otimes R_y\left(-\frac{\theta_{c_2}}{2}\right);$$

wherein:
X is a quantum NOT operation;
$R_y$ represents a rotation operator; and
angles $\theta_{c_1}$, $\theta_{c_2}$ represent the first and second training vectors;

perform, using the quantum computing device, quantum interference between the modified first copy of the test vector and the modified second copy of the test vector, and the modified first training vector and the modified second training vector, to provide modified quantum states of the qubits;

perform, using the quantum computing device, a measurement on one or more of the qubits; and classify the test vector based on the measurement.

* * * * *